United States Patent
Lothe

(10) Patent No.: US 7,096,689 B2
(45) Date of Patent: Aug. 29, 2006

(54) METHOD AND A DEVICE FOR LOADING PETROLEUM

(75) Inventor: Per Lothe, Førresfiorden (NO)

(73) Assignee: Knutsen OAS Shipping AS, (NO)

( * ) Notice: Subject to any disclaimer, the term of this patent is extended or adjusted under 35 U.S.C. 154(b) by 308 days.

(21) Appl. No.: 10/474,237

(22) PCT Filed: Apr. 3, 2002

(86) PCT No.: PCT/NO02/00131

§ 371 (c)(1),
(2), (4) Date: Mar. 29, 2004

(87) PCT Pub. No.: WO02/081298

PCT Pub. Date: Oct. 17, 2002

(65) Prior Publication Data

US 2004/0148963 A1    Aug. 5, 2004

(30) Foreign Application Priority Data

Apr. 3, 2001   (NO) ................................. 20011659

(51) Int. Cl.
*F25J 3/00* (2006.01)

(52) U.S. Cl. ......................................... 62/618; 62/620
(58) Field of Classification Search ................ 62/613, 62/619, 611, 617, 618, 620, 53.2, 48.2, 923; 220/88.3
See application file for complete search history.

(56) References Cited

U.S. PATENT DOCUMENTS

| 4,276,749 A | 7/1981 | Crowley |
| 5,176,002 A | 1/1993 | O'Brien et al. |
| 5,678,423 A * | 10/1997 | Davies et al. ................. 62/613 |
| 5,803,005 A | 9/1998 | Stenning et al. |
| 5,860,294 A | 1/1999 | Brendeng |

* cited by examiner

*Primary Examiner*—William Doerrler
*Assistant Examiner*—Michael J. Early
(74) *Attorney, Agent, or Firm*—Andrus, Sceales, Starke & Sawall, LLP

(57) ABSTRACT

A method of separating volatile organic components, so-called VOC, from crude oil, where, as it is loaded onto a ship, the crude oil is passed into a process vessel (2) in which is established a negative pressure adjusted according to the vapour pressure of the oil, from where the liquid phase of the crude oil flows to the ship's cargo tanks, while the gas phase, the VOC, is extracted from the process vessel (2).

4 Claims, 1 Drawing Sheet

METHOD AND A DEVICE FOR LOADING PETROLEUM

CROSS REFERENCE TO RELATED APPLICATION

The present application is the U.S. national stage application of International Application PCT/NO02/00131, filed Apr. 3, 2002, which international application was published on Oct. 17, 2002 as International Publication WO 02/08 1298. The International Application claims priority of Norwegian Patent Application 20011659, filed Apr. 3, 2001.

This invention regards a method of loading petroleum that exists mainly in the form of a liquid, but which contains fractions of volatile organic compounds, hereinafter termed VOC. The invention also regards a device for implementing the method.

FIELD OF THE INVENTION

When loading e.g. crude oil from a platform onto a tanker, the volatility of the components causes considerable evaporation of VOC, e.g. in the form of methane and propane. The degree of evaporation varies with the crude oil quality, the vapour pressure of the oil being of great significance. The fraction of VOC that evaporates during loading onto a vessel where the tank pressure is normally kept between 1.05 and 1.07 bar, is in the order of 0.5%.

After being drained, the tanks onboard the tanker are customarily filled with a non-flammable gas. Normally, waste gases from a combustion process are used, whereby the tank is filled mainly with nitrogen and carbon dioxide, but also other combustion products such as soot.

When the crude oil flows into the cargo tanks of the ship at a rate which in the case of single-point buoy mooring loading may be 8000 $m^3$ per hour, an immediate evaporation of VOC takes place, which VOC mixes with the combustion gases already present in the tank. The VOC and the combustion gases must be removed from the tanks immediately, to prevent a pressure increase in the tank. According to prior art, the gases are vented to the atmosphere, or they are taken care of in a separator that separates the VOC and the combustion gases, whereupon the VOC is used as fuel for the ship and/or reinjected into the cargo.

During the first phase of the loading, when the liquid fill-up level in the tanks is relatively low, the fraction of VOC in the combustion gases present in the tanks is relatively small. Thus the separation plant must treat and separate a relatively large fraction of combustion gases from the VOC that is drawn out of the tanks. As the tanks fill up, the concentration of VOC increases, and when the tanks are nearly full, the separation plant treats almost exclusively VOC. The separation plant must have a compressor capacity that enables it to compress gas at the same rate as that of the oil loading. Plants of this type are both large and complex, and it has proven difficult to achieve satisfactory operation and reliability of plants according to prior art.

During transport, sloshing and movement in the cargo will cause more and reinjected VOC to separate out from the cargo again.

Plants according to prior art have not been designed to handle the VOC separated out during transport, and moreover do not exhibit features that make it possible to meet the imminent requirements from the authorities for 90% recovery of VOC. Plants according to prior art are also very costly to install and operate.

BACKGROUND OF THE INVENTION

The object of the invention is to remedy the disadvantages of prior art.

The object is achieved in accordance with the invention by the characteristics given in the description below and in the appended claims.

Crude oil that is pumped onboard a tanker via e.g. a single-point buoy mooring loading system is passed into a process vessel in which VOC is separated from the crude oil under negative pressure. The negative pressure is adjusted according to the vapour pressure and gas content of the oil, and is typically of the order of 0.7 bar absolute. The VOC present in the oil is immediately evaporated from the oil and extracted from the separation vessel by means of e.g. gas compressors of a type that is known per se. Preferably, the degassed oil flows through a liquid seal and into the cargo tanks of the ship. The liquid seal is designed to maintain an appropriate liquid level in the process vessel, and the principle of operation of the liquid seal will be explained in greater detail with reference to the appended drawings in the specific part of the description.

VOC that is extracted from the process vessel is compressed through several compression stages, with each stage typically comprising a so-called scrubber in which the fraction of VOC that has liquefied is separated out, while the remaining gas phase is preferably extracted through a cooler by means of a compressor.

After sufficient compression and cooling, the predominant fraction of VOC has been converted to liquid, whereupon it is pumped into pressurized cargo tanks located on the ship. The pressurized cargo tanks are dimensioned to hold the required quantity of VOC from a cargo of oil.

The separated VOC contained in the pressurized cargo tanks of the ship is a high-grade product that may be sold separately, used to fuel the ship, or be reinjected into the oil cargo during unloading.

Experiments have shown that crude oil treated according to the invention will only give off an insignificant amount of VOC during transport. The energy requirements of the process only amount to 20% of the energy required for treatment according to prior art, and one may expect to retain more than 90% of the VOC in the oil.

BRIEF DESCRIPTION OF THE DRAWINGS

The following describes a non-limiting example of a preferred embodiment illustrated in the enclosed drawing, where.

DETAILED DESCRIPTION OF THE INVENTION

Figure 1:
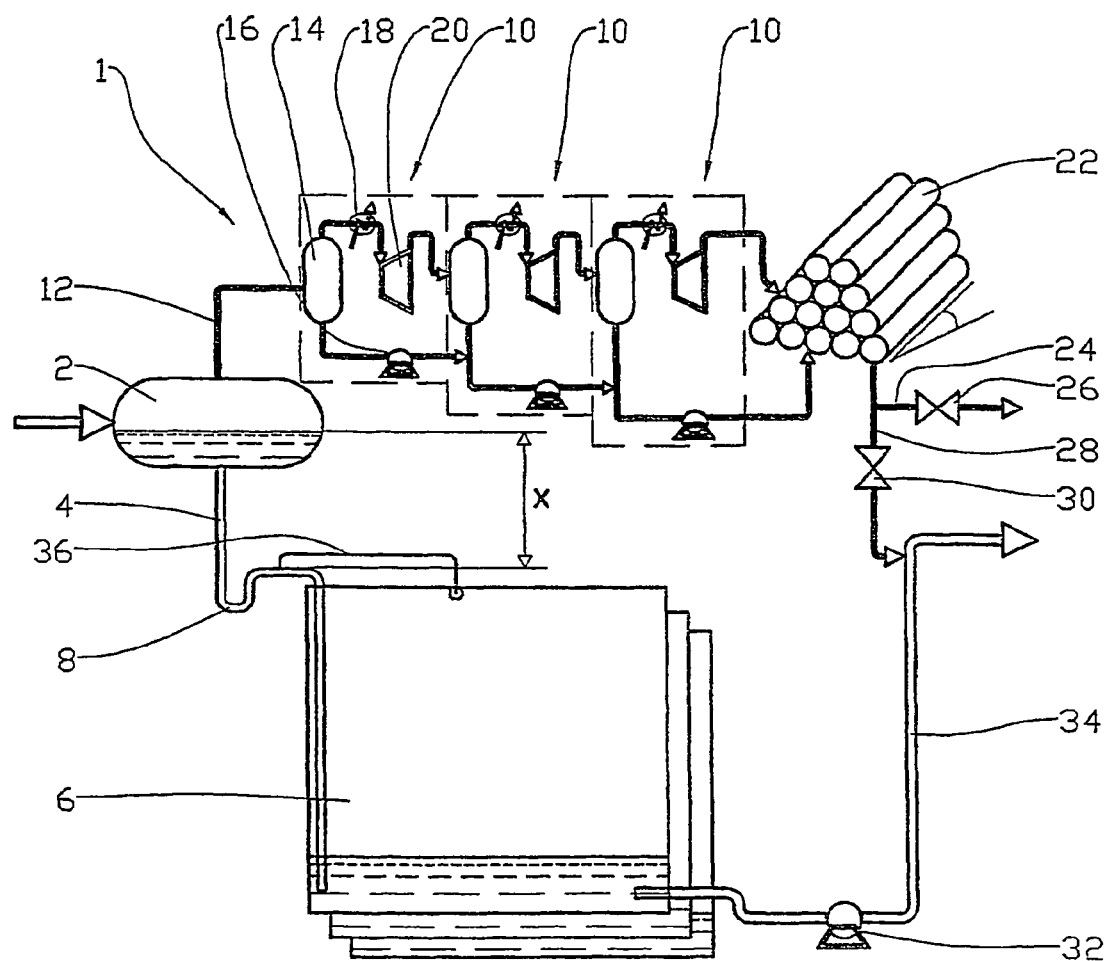
FIG. 1 schematically shows the principal components of the process.

In the drawing, reference number 1 denotes a ship based process plant for treating crude oil from e.g. fixed or floating installations.

The process plant 1 comprises a process vessel 2 into which the crude oil flows via e.g. a single-point buoy mooring loading system. Following evaporation of the gas phase of the oil, the liquid phase flows through a connecting pipe 4 to the ship's cargo tanks 6. The connecting pipe 4 is equipped with a liquid seal 8 that, together with the connecting pipe 4, is designed to maintain a desired negative pressure in the process vessel 2. The principle of operation of the pipe 4 and the liquid seal 8 will be explained in greater detail below.

The gas phase of the crude oil is extracted from the process vessel 2 into the first of several condensation stages 10 of a type that is known per se, via a gas pipe 12. A condensation stage 10 typically comprises a scrubber 14 in which condensed gas is separated out, a condensate pump 16, a gas cooler 18 and a compressor 20. As the gas pressure increases through the condensation stages 10, which are connected in series, more and more of the gas is condensed and then pumped into the pressurized cargo tanks 22 of the ship, essentially in a liquid state. The pressurized cargo tanks 22 are arranged so as to leave the tank 22 outlet at the lowest point of the tanks 22, whereby the gas pressure in the tanks 22 will drive the liquid phase out through the tank 22 outlets when the tanks 22 are drained.

The VOC liquid from the pressurized tanks 22 may be-unloaded separately via a pipe 24 and a valve 26, or be reinjected via a pipe 28 and a valve 30 into the crude oil cargo, which is unloaded via a pump 32 and an unloading pipe 34.

In a preferred variant of the method, the liquid level of the process vessel 2 is located from 3 to 4 metres above the outlet level of the liquid seal 8. The distance is marked with an "X" in FIG. 1. The liquid column in the large outlet pipe 4 and the liquid seal 8 will draw liquid out of the process vessel 2 until a negative pressure arises in the process vessel 2 which will compensate for the weight of said liquid column. Crude oil is fed to the process vessel 2 at a lower rate than the greatest discharge rate through the outlet pipe 4, whereby the negative pressure in the process vessel 2 controls the outlet rate, while the level difference X between the process vessel 2 and the outlet of the liquid seal 8 controls the negative pressure of the process vessel. Thus the system is self-regulating, making a flow control valve in the outlet pipe 4 unnecessary. The VOC fraction in the crude oil will immediately boil out of the crude oil in the process vessel 2, and it is obvious that extraction of VOC from the process vessel 2 must be regulated according to the VOC content of the crude oil A bleed air pipe 36 connects the ship's cargo tanks 6 with the outlet of the liquid seal 8, and is designed to prevent the liquid level of the cargo tanks 6 from affecting the pressure head X.

The method according to the invention will allow significant savings on costs and energy when the authorities' requirements for 90% recovery of VOC during offshore loading have to be met.

The invention claimed is:

1. A method of separating volatile organic components, so-called VOC, from crude oil, characterised in that as it is loaded onto a ship, the crude oil is passed into a process vessel (2) in which is established and maintained a negative pressure adjusted according to the vapour pressure of the crude oil, wherefrom the liquid phase of the crude oil flows to the cargo tanks of the ship, while the gas phase, the VOC, is extracted from the process vessel (2).

2. A method in accordance with claim 1, characterised in that the gas phase, the VOC, while essentially in a liquid state, is compressed and loaded into pressurised cargo tanks (22) located on the ship.

3. A device for separating volatile organic components, VOC, from crude oil during loading onto a ship, characterised in that the ship is equipped with a process vessel (2) designed to treat the crude oil by means of negative pressure prior to the oil flowing into the ship's oil cargo tanks, whereby mixing of the volatile organic components, the VOC, of the crude oil and the combustion gases present in the ship's oil cargo tanks, is avoided.

4. A device in accordance with claim 3, characterised in that the negative pressure in the process vessel (2) is maintained and controlled mainly by a liquid column located in a connecting pipe (4) positioned below the process vessel and a subsequent liquid seal (8).

* * * * *